United States Patent
Helland et al.

(10) Patent No.: US 12,153,603 B2
(45) Date of Patent: Nov. 26, 2024

(54) DATABASE LAYERED FILTERING

(71) Applicant: Salesforce, Inc., San Francisco, CA (US)

(72) Inventors: Patrick James Helland, San Rafael, CA (US); David Edward DeHaan, Burlington (CA)

(73) Assignee: Salesforce, Inc., San Francisco, CA (US)

( * ) Notice: Subject to any disclaimer, the term of this patent is extended or adjusted under 35 U.S.C. 154(b) by 34 days.

(21) Appl. No.: 18/064,112

(22) Filed: Dec. 9, 2022

(65) Prior Publication Data

US 2024/0193186 A1    Jun. 13, 2024

(51) Int. Cl.
| | |
|---|---|
| G06F 16/00 | (2019.01) |
| G06F 16/22 | (2019.01) |
| G06F 16/2457 | (2019.01) |
| G06F 16/28 | (2019.01) |

(52) U.S. Cl.
CPC ........ *G06F 16/282* (2019.01); *G06F 16/2246* (2019.01); *G06F 16/24573* (2019.01)

(58) Field of Classification Search
None
See application file for complete search history.

(56) References Cited

U.S. PATENT DOCUMENTS

| | | | |
|---|---|---|---|
| 10,909,102 B2 | 2/2021 | Wang et al. | |
| 11,151,028 B2 | 10/2021 | Idreos et al. | |
| 2020/0341889 A1* | 10/2020 | Idreos | G06F 16/1734 |
| 2021/0144517 A1* | 5/2021 | Guim Bernat | H04L 41/0869 |

* cited by examiner

*Primary Examiner* — Tuankhanh D Phan

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed pertaining to layered filtering. A computer system may store records in a hierarchy of levels. The computer system may receive a request to perform a key range search to locate records that fall within a key range and satisfy selection criteria. The computer system may perform the key range search. As part of processing a particular level, the computer system may receive a first set of records associated with another level and select a second set of records from the particular level that fall within the key range and satisfy the selection criteria. The computer system may merge the first and second sets of records into a third set of records, which may include not inserting, into the third set, any record of the first set of records for which there is a newer version in the particular level that does not satisfy the selection criteria.

20 Claims, 6 Drawing Sheets

DATABASE LAYERED FILTERING

BACKGROUND

Technical Field

This disclosure relates generally to a database system and, more specifically, to various mechanisms for filtering database records at different levels of the database system.

Description of the Related Art

Modern database systems routinely implement management systems that enable users to store a collection of information in an organized manner that can be efficiently accessed and manipulated. In some cases, these management systems maintain a log-structured merge-tree (LSM tree) comprising multiple levels that each store information in database records as key-value pairs. A database system can include a persistent storage that houses the LSM tree and a database node having an in-memory buffer. During operation, the database node initially writes records into the in-memory buffer before later flushing them to the persistent storage. As a part of flushing the records, the database node writes them to new files that are stored in one of the many levels of the LSM tree. Over time, the records are rewritten into new files stored in lower levels as the records are moved down the LSM tree.

DETAILED DESCRIPTION

Figure 1:
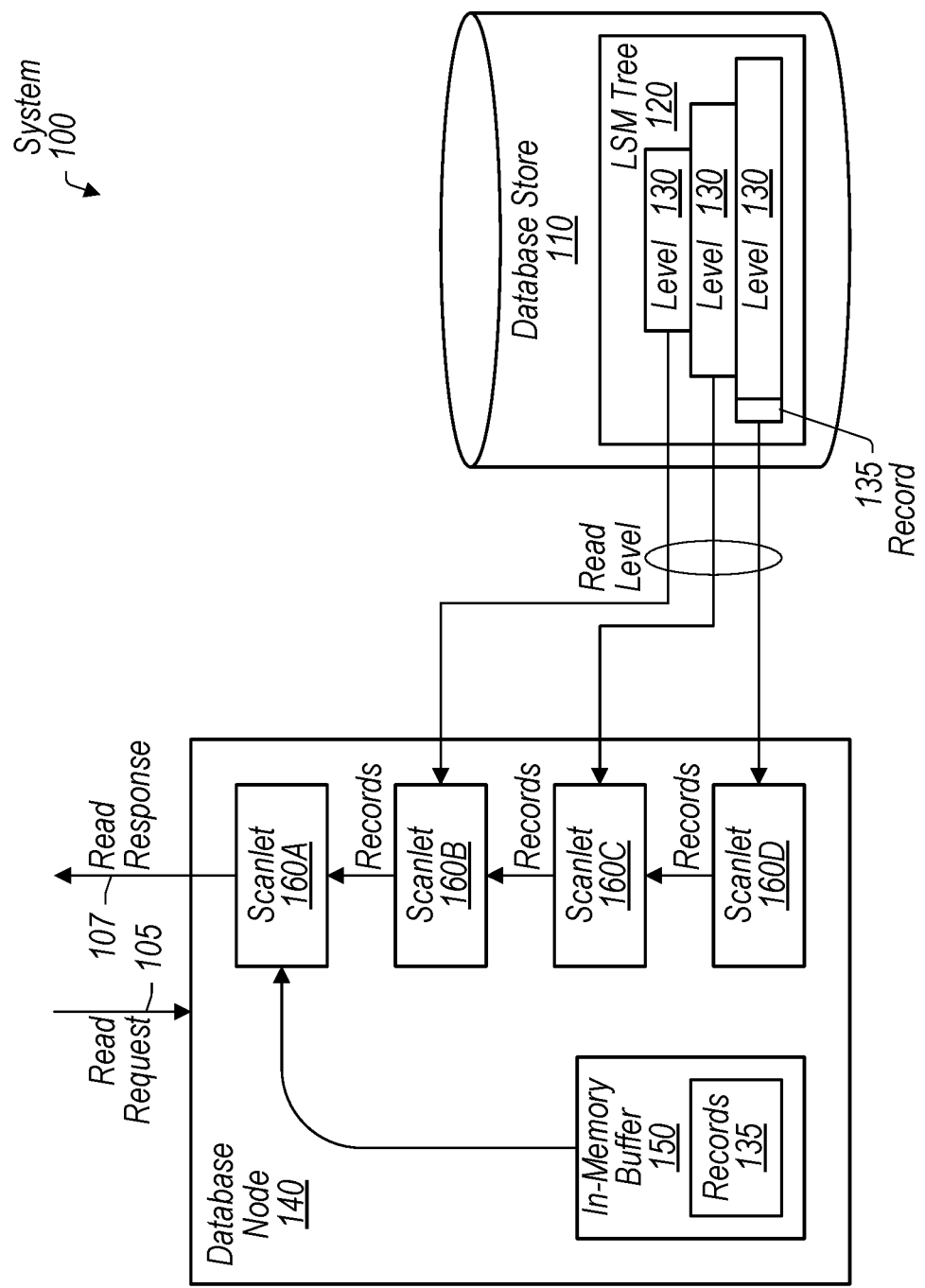
FIG. 1 is a block diagram illustrating example elements of a system having a database store and a database node, according to some embodiments.

As mentioned, a database system often operates a database that is built around an LSM tree in which database records are stored in files written to persistent storage. During operation, a database node of the database system processes transaction requests that can involve writing records to an in-memory buffer and flushing those records to the LSM tree, where those records are "merged" down the tree over time by being copied from higher levels into lower levels and then removed from those higher levels. The in-memory buffer and the LSM tree can be viewed as a hierarchy of levels, where the in-memory buffer is the top level and the LSM tree includes the remaining levels. Because records are merged down the hierarchy, records in higher levels are newer and thus supersede records in lower levels. For example, two records can be written for the same underlying data construct (e.g., a row in a database table) with one of the records being written later to overwrite one or more values that were included in the other record. Since the former record is written later, it will reside in a higher level of the hierarchy than the latter record. Records corresponding to the same underlying data construct are referred to as "record versions" of the data construct as they represent different versions of that data construct, and the term "record version" is also used interchangeably with the term "record" unless indicated otherwise. When performing a given single-key search to locate the latest record version for a key, the database system traverses down levels of the hierarchy starting from the top level until it encounters a record version for that key and then returns that record version as it is the latest record version due to the properties discussed above.

When performing a key range scan to locate records in a key range, the database system may spawn a process for each level of the hierarchy that scans its level for any records that fall within the key range. The process returns any records that it locates, and a total set of records is compiled from the records returned by all the processes. The database system filters the total set of records based on selection criteria and applies any column projections (i.e., selects the columns that will be returned for the key range scan) that were specified in a query associated with the key range scan. One downside to this approach is that filtering and column projections are applied only on the complete set of records and columns returned by all processes. That is, all records located by a process are handed over by the process for its level, but only a subset of those records may actually be returned as a result for the key range scan depending on which ones are filtered out. For example, the lowest level may include the highest number of records and thus is more likely to have records that fall within a key range but are filtered out due to higher levels having newer records. Those records from the lowest level are passed around the database system until the end of the key range scan when the filtering and column projections are applied. This can consume a large amount of bandwidth and system computing resources and thus it may be desirable to push at least a portion of the filtering and column projections to lower levels. This disclosure addresses, among other things, the problem of how to perform filtering and column projections at different levels of a database, such as one built around an LSM tree.

In various embodiments described below, a computer system includes a database node and a database store that stores records as part of an LSM tree comprising levels of a hierarchy of levels in a database. The database node may receive a request to perform a key range search to locate records that fall within a specified key range and satisfy selection criteria (e.g., city=Houston). In various embodiments, the database node then performs the key range search by searching one or more levels of the hierarchy and returning records from one level to the next higher level. Accordingly, for a particular level, the database node may obtain/receive a first set of records associated with lower levels. The database node then selects, from the particular level, a second set of records that fall within the specified key range and satisfy the selection criteria. The database node may then merge the first and second sets of records into a third set of records to be passed up to the search operation performed at the next higher level. As a part of merging those sets of records, in various embodiments, the database node does not include, in the third set of records, any record of the first set of records for which there is a newer record version in the particular level that does not satisfy the selection criteria. That is, if a first record supersedes a second record and the first record is filtered out, then the second record should be filtered out as well. Consequently, because records in higher levels supersede records in lower levels, if the database node filters out a record from the particular level and there is a record included in the first set that is superseded by that filtered record, then the database node filters out the superseded record as well and, as a result, it is not included in the third set of records provided to the search operation at the next higher level. For example, the first set may include a record that specifies "Dallas" under a "city" column and the particular level may include an updated version of that record that specifies "Houston." The selection criteria may be "city=Dallas" and thus the former record survives the filter but the updated version does not. Since the updated version supersedes the former record and it was filtered out, then the former record is also filtered out at the particular level by not being passed up to the next level. This process may be performed by the database node for one or more levels. After a total set of records is obtained from the hierarchy of levels, the database node may perform a filter operation (and potentially a set of column projections) on the total set to generate a result set that is returned as a response to the key range search.

These techniques may be advantageous over prior approaches as these techniques allow for record filtering and column projections to be performed at different levels of a hierarchy of levels. As a result, less records may be transferred between processes that are implementing a key range search, conserving network and computing resources. Moreover, being able to filter and apply column projections at different levels of the database may allow for distributed query evaluations. In particular, the work of performing record filtering and column projections may be distributed to different parts of a database system (e.g., to storage servers that store the data of the database) to offload work from a primary database engine, freeing that primary database engine to perform other work—that is, portions of the work involved in a key range search can be distributed. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database store 110 and a database node 140 that can access database store 110. As further shown, database store 110 includes a log-structured merge tree (LSM tree) 120 comprising levels 130 having records 135, and database node 140 includes an in-memory cache 150 having records 135. Also as shown in FIG. 1, database node 140 executes scanlets 160A-D. In some embodiments, system 100 is implemented differently than shown—e.g., system 100 might include multiple database nodes 140, one or more levels 130 of LSM tree 120 may reside in different database stores, scanlets 160 may be executed by storage servers that implement database store 110, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Accordingly, database store 110 and database node 140 may utilize the available cloud resources of that cloud infrastructure (e.g., computing resources, storage resources, etc.) in order to facilitate their operation. For example, database node 140 may execute within a virtual environment hosted on server-based hardware included in a datacenter. But in some embodiments, system 100 is implemented using a local or private infrastructure as opposed to a public cloud.

Database store 110, in various embodiments, includes a collection of information that is organized in a manner that allows for access, storage, and manipulation of that information. Database store 110 may include supporting software (e.g., storage nodes) that enables database node 140 to carry out those operations (e.g., accessing, storing, etc.) on the information that is stored at database store 110. In various embodiments, database store 110 is implemented using a single or multiple storage devices that are connected together on a network (e.g., a storage attached network (SAN)) and configured to redundantly store information in order to prevent data loss. The storage devices may store data persistently and therefore database store 110 can serve as a persistent storage for system 100. In various embodiments, data written to database store 110 by database node 140 is accessible to other database nodes 140 within a multi-node configuration (e.g., a database node cluster or a system having multiple database node clusters spread across different cloud zones that are provided by a cloud provider). As shown, database store 110 includes LSM tree 120, which organizes at least a portion of the data of the database that is managed by database node 140.

Log-structured merge-tree 120, in various embodiments, is a data structure storing files (having records 135) in an organized manner that uses a level-based scheme. A record 135, in various embodiments, is a key-value pair comprising data and a database key that is usable to look up that record 135. For example, a record 135 may correspond to a data row in a database table where the database record specifies values for one or more attributes associated with that database table. In various embodiments, records 135 are immutable once written. Accordingly, in order to update the values of a given record 135, database node 140 writes a new record 135 with the updated values that supersedes the older record 135. That older record 135, however, may continue to persist in the database. As a result, the same underlying data construct (e.g., a row) can be associated with multiple record versions, with the latest version being located in a higher level 130 than the other, older record versions.

A level 130, in various embodiments, is a storage area in which a set of records 135 are stored. In some embodiments, levels 130 correspond to different types of storage devices (e.g., solid state drives (SSDs), hard disk drives (HDDs), etc.), where lower levels 130 correspond to slower devices with higher storage capacity. For example, the top level 130 of the hierarchy of levels might be implemented using random-access memory, the next set of lower levels 130 might be implemented using SSDs, and the remaining lower levels 130 might be implemented using HDDs. Accordingly, as a record 135 is superseded and becomes older, it may be copied to colder and colder storage as it is accessed less. In various embodiments, database node 140 periodically executes a merger routine to copy records 135 from a first level 130 into a second, lower level 130. An example of the hierarchy of levels 130 is discussed in greater detail with respect to FIG. 2.

Database node 140, in various embodiments, facilitates database services, such as data retrieval, data manipulation, and data storage. In various embodiments, database node 140 is software that is executable on hardware, while in some embodiments, it encompasses both the hardware and the software. The database services may be provided to components internal and external to system 100. For example, database node 140 may receive a transaction request from an application node to perform a database transaction. A database transaction is a logical unit of work (e.g., a specified set of database statements) to be performed in relation to a database of system 100. As an example, processing a database transaction may include executing a SQL SELECT statement to select one or more rows of table. The contents of a row can be specified in a record 135 and thus database node 140 may return one or more requested records 135 that correspond to those one or more rows.

A database transaction can also involve database node 140 writing one or more records 135 to the database. Consequently, in various embodiments, database node 140 initially writes records 135 to its in-memory buffer 150 before flushing them to database store 110. In-memory buffer 150, in various embodiments, is a buffer that stores data in a memory (e.g., random access memory) of database node 140. In-memory buffer 150 might be flushed at set intervals of time or in response to becoming full or close to full. When flushing in-memory buffer 150, database node 140 may write a portion or all of the records 135 of in-memory buffer 150 to a set of files in the top level 130 of LSM tree 120. Because database node 140 initially writes a record 135 to in-memory buffer 150, in various embodiments, in-memory buffer 150 is considered the top level 130 of the hierarchy of levels that is implemented for the database of system 100 and the remaining levels are part of LSM tree 120.

Processing a database transaction may involve performing a key range search to locate records 135 that fall within a specified key range. A key range search can also involve selection criteria, a set of column projections, and a search transaction commit number (a search XCN) that affect which records 135 are returned and the shape of the records 135 (i.e., which columns of the record 135 are returned). Since records 135 are moved down levels 130 of the hierarchy, a record 135 that satisfies the stipulations of a key range search may be located within any one of the levels 130 of the hierarchy. As a result, database node 140 may search most or all levels 130 of the database when performing a key range search. To speed up the key range search, in various embodiments, database node 140 searches those levels 130 at least partially in parallel using scanlets 160.

A scanlet 160, in various embodiments, is a computer process that scans a level 130 for records 135 that fall within a key range. Accordingly, for each level 130 being scanned (which can include in-memory buffer 150), database node 140 may instantiate a scanlet 160 that scans its corresponding level 130 and obtains zero or more records 135. As depicted in the illustrated for example, database nodes 140 spawns four scanlets 160A-D to scan in-memory buffer 150 and the three illustrated levels 130 of LSM tree 120. The records 135 obtained by a scanlet 160 may be returned (e.g., to a scanlet 160 of another level 130) in key-sorted order. In addition to searching for records 135, in various embodiments, a scanlet 160 may also apply filtering and column projections to the records 135 that it obtains. As an example, a key range search might specify that only records 135 having a particular value should be returned. A scanlet 160 may locate a record 135 that falls within the key range but does not include the particular value. As a result, that scanlet 160 filters out that record 135 such that it is not included in the result that is returned by that scanlet 160. Continuing the example, the key range search may specify that only a subset of columns be returned for a record 135 and therefore that scanlet 160 may drop the other columns from the records 135 that it is returning. In some embodiments, the filtering and column projections are performed by another process (e.g., a merge process) than scanlets 160. After scanning for records 135 and applying filtering and column projections, in various embodiments, a scanlet 160 returns its results to another scanlet 160 that is processing a higher level 130. In some embodiments, a scanlet 160 does not return records 135 as a batch once its scan has been completed, but instead streams records 135 as they are located and filtered. That is, when a record 135 is located, a scanlet 160 may return it to the next scanlet 160 (if it is not filtered out) before scanning for another record 135.

Certain conditions may arise in which a scanlet 160 receives a record 135 from a lower level 130 that should be filtered out. In particular, a scenario may arise in which an older record version satisfies the stipulations of a key range search, but a newer record version does not. As a result, the older record version is not filtered out by the scanlet 160 that finds it and thus it is passed up to scanlets 160 associated with higher levels 130. Since the superseding newer record version does not satisfy the stipulations of a key range search and thus is filtered out, returning the older record version in a response to the key range search would be a flawed result. Thus, in various embodiments, when a scanlet 160 filters out a record 135, it may determine whether it received a record 135 for the same key (an older record version) from a different scanlet 160. If it received such a record 135, then it may also filter out that record 135 so that it is not passed to a scanlet 160 of a higher level and returned in the final response to the key range search. By performing this check, work (e.g., filtering and projections) may be pushed farther down in the hierarchy of levels, which can reduce the number of records 135 that moved around in system 100 for a key range search.

While one scanlet 160 per level 130 is depicted in the illustrated embodiment, a scanlet 160 may process multiple levels 130. As an example, a scanlet 160 may be spawned that scans three adjacent levels 130 by advancing through those levels 130 in an interleaved fashion as records 135 are combined into a resulting set. That is, that scanlet 160 may traverse those levels 130 in parallel, and records 135 that fall within the specified key range and satisfy the selection criteria may be added to the resulting set. If two or more of the levels 130 include a record 135 for the same key, then the record 135 from the highest level of those levels 130 is added. But if the record 135 from the highest level of those levels 130 is filtered out, then none of the other records 135 for that key are added, in various embodiments.

Figure 2:
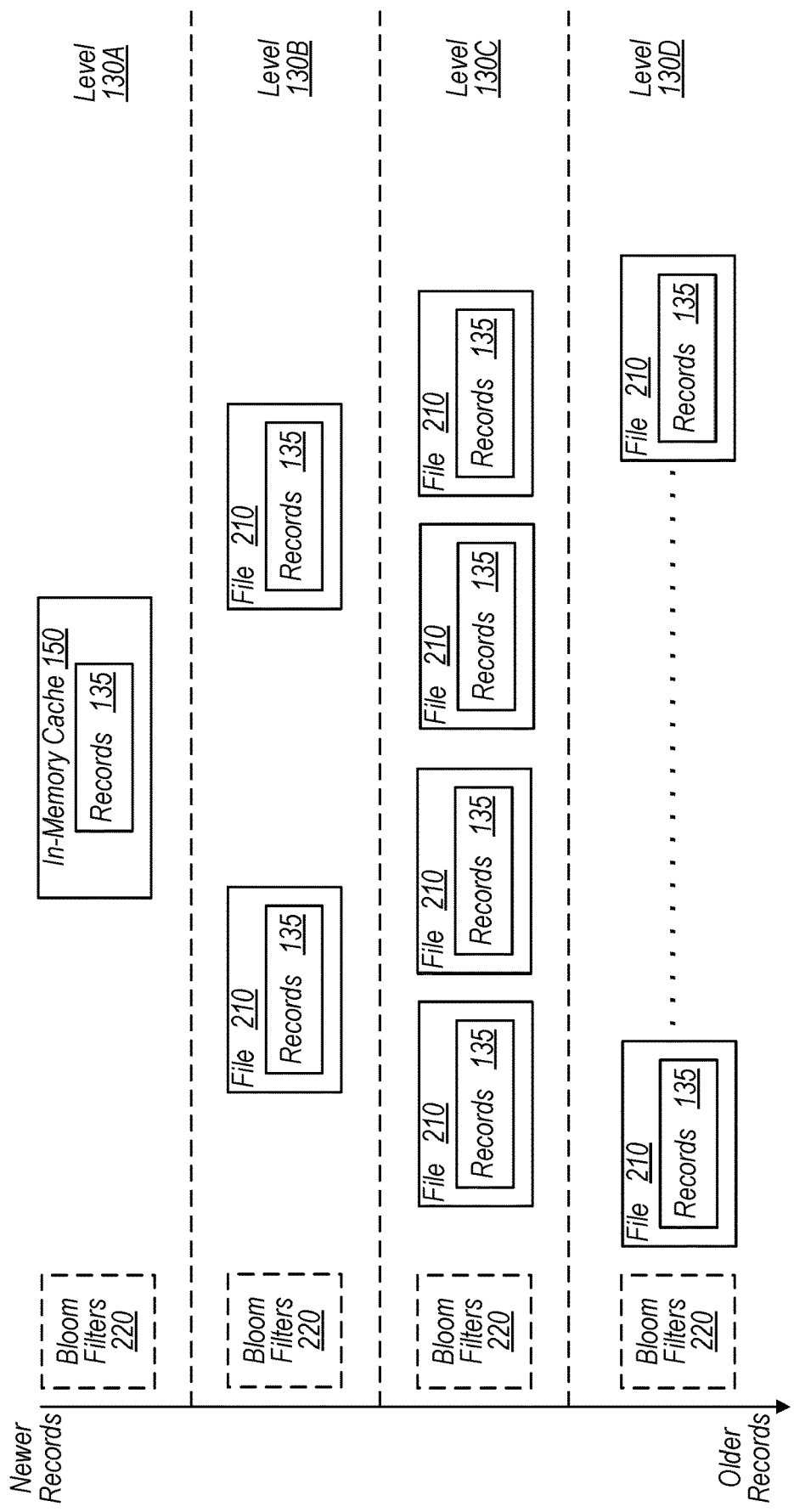
FIG. 2 is a block diagram illustrating an example layout of levels facilitated by an in-memory cache and an LSM tree, according to some embodiments.

Turning now to FIG. 2, a block diagram of an example hierarchy of levels 130 is shown. In the illustrated embodiment, there are four levels 130A-D. As shown, levels 130A comprises in-memory cache 150 that stores records 135, while levels 130B-D include files 210 that store records 135—levels 130B-D may correspond to LSM tree 120. Also as shown, levels 130A-D include a respective set of Bloom filters 220. The illustrated embodiment may be implemented differently than shown. For example, levels 130A-D might not include Bloom filters 220, level 130B (an example top level of LSM tree 120) may include only one file 210, etc.

In various embodiments, LSM tree 120 is organized such that its levels store differing amounts of files 210 in order to improve read performance. A file 210, in various embodiments, is a collection of records 135 that are stored in key-sorted order. The differing amounts of files 210 in each level 130 give LSM tree 120 the appearance of being a tree structure in which the top level 130 of LSM 120 stores the least amount of files 210 and each subsequent, lower level 130 stores more files 210 than the previous level 130. In various embodiments, database node 140 periodically performs a merge operation in which records 135 in files 210 of one level 130 are merged or copied along with other files 210 of the next level 130 down into new files 210 in that next level 130. As an example, records 135 from the first file 210 of level 130B may be written with records from the first file 210 of level 130C into a new file 210 in level 130C. As a result of database node 140 performing these merge operations, records 135 are moved down the hierarchy of levels 130 over time. As records 135 are copied into a new level 130, Bloom filters 220 may be created based on database keys of those records 135, and as records 135 are removed from a level 130, corresponding Bloom filters 220 may be removed as well.

Bloom filters 220, in various embodiments, are probabilistic data structures that encode database keys and may provide an indication that a particular item either does not exist or may exist at a particular location within a system. For example, a Bloom filter 220 can indicate, for a particular database key, that a record 135 does not exist or may exist in a level 130 associated with that Bloom filter 220. Accordingly, in various embodiments, the set of Bloom filters 220 for a particular level 130 are generated based on the records 135 stored in that particular level 130. When a record 135 is written to a level 130, its database key may be inserted by database node 140 in a Bloom filter 220 of that level 130—that Bloom filter 220 may correspond to the file 210 that includes the record 135. To insert a database key into a Bloom filter 220, in various embodiments, database node 140 hashes the database key and sets bits in the Bloom filter 220 based on the resulting hash value. Since there can be overlap in the bits set for database keys, a scenario can arise in which the bits for a certain database key have been set, but that database key was not inserted into the associated Bloom filter 220. Bloom filters 220 thus do not indicate that a record 135 exists with absolute certainty. As discussed in more detail with respect to FIG. 3, Bloom filters 220 may be used by a scanlet 160 to determine whether a record 135 received from a scanlet 160 of a lower level is to be filtered out.

Figure 3:
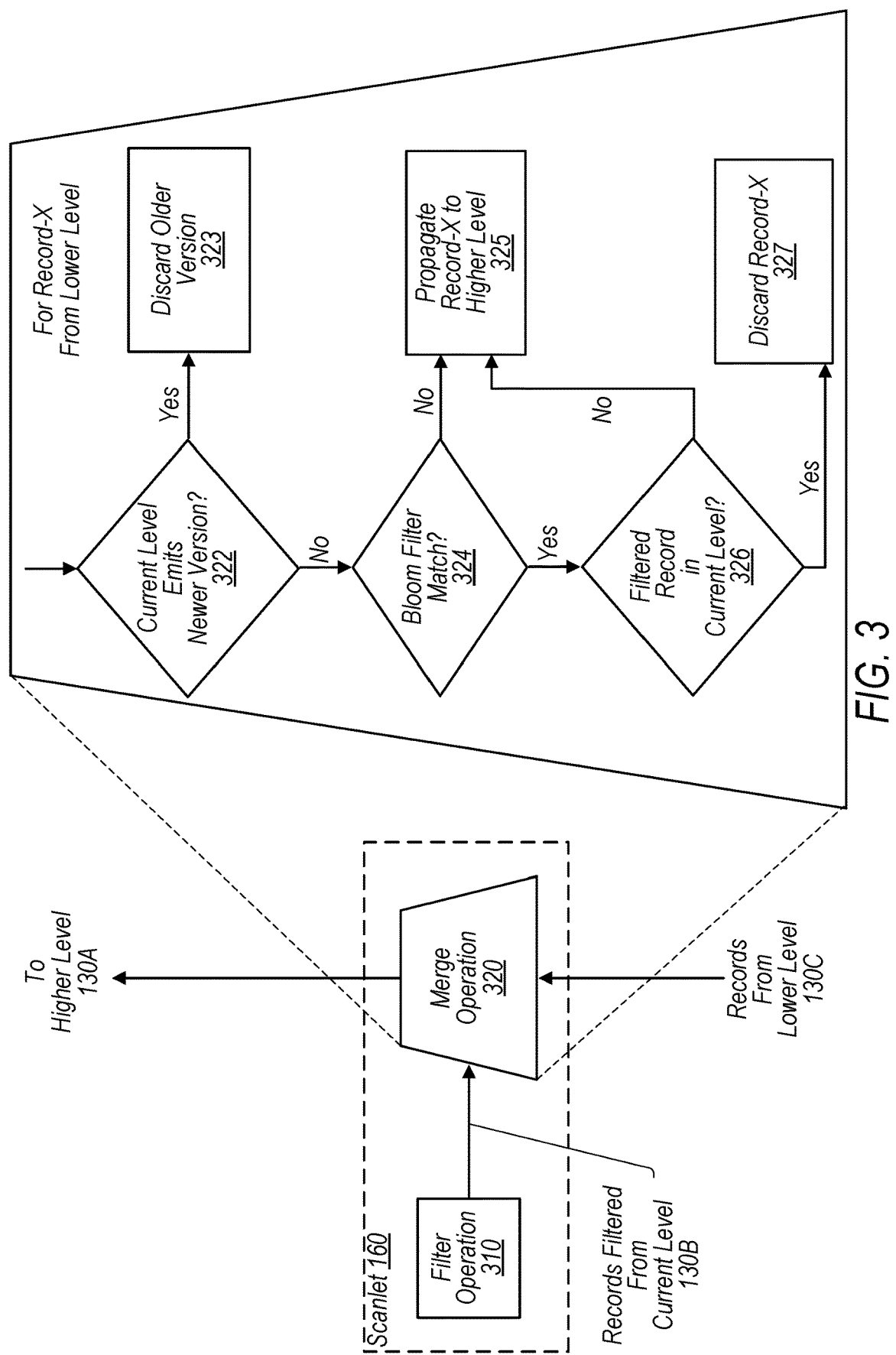
FIG. 3 is a block diagram illustrating example elements of a filter and a merge operation, according to some embodiments.

Turning now to FIG. 3, a block diagram of example operations performed by a scanlet 160 is shown. In the illustrated embodiment, scanlet 160 performs a filter operation 310 and a merge operation 320. As further shown, merge operation 320 includes steps 322-327. In some embodiments, filter operation 310 and/or merge operation 320 may be implemented differently than shown. For example, merge operation 320 may not include a step in which a Bloom filter 220 is used—i.e., step 324. While scanlet 160 is discussed as performing filter operation 310 and merge operation 320, in some embodiments, one or both of these operations are performed by a different process. For example, scanlet 160 may scan its level 130 for records 135 that fall within a specified key range and then stream located records 135 to another process of database node 140 that performs filter operation 310 and merge operation 320.

As discussed, a key range search can involve a key range and a set of selection criteria that determine which records 135 are returned (if any) to the requestor. Accordingly, in various embodiments, scanlet 160 identifies records 135 from its level 130 that fall within the specified key range and then applies filter operation 310 to select, from the identified records 135, only those records 135 that satisfy the set of selection criteria. In some embodiments, only a subset of the scanlets 160 may perform filter operation 310—an example of which is presented in FIG. 4—thus scanlet 160 may identify records 135 that fall within the specified key range but might not filter them before passing them to the next stage of the key range search (e.g., a scanlet 160 of a higher level 130). Separate from filter operation 310, scanlet 160 may identify only records 135 that are associated with XCNs less than or equal to a search XCN. That is, when a record 135 is committed by database node 140, in various embodiments, it is associated with an XCN that is indicative of when it was committed. A key range search may request records 135 that were committed before a particular time by identifying a search XCN. Accordingly, the search XCN may be used to filter records that were committed after the search XCN (i.e., the records 135 are associated with XCNs greater than the search XCN). Records 135 outputted from filter operation 310 (or that simply fall within the key range if no filter operation 310 is applied) are provided as input into merge operation 320 to produce a resulting set that is passed to the next stage of the key range search.

Merge operation 320, in various embodiments, is a set of actions performed by scanlet 160 to merge records 135 from its level 130 (e.g., level 130B) with records 135 from a lower level 130 (e.g., level 130C) into a resulting set of records 135 that is passed to a scanlet 160 of a higher level (e.g., level 130A) (if applicable). As shown, merge operation 320 involves steps 323-327. In step 322, scanlet 160 determines, for a record 135 passed from a lower level 130 (e.g., level 130C), whether a record 135 corresponding to the same key was outputted by filter operation 310. If a record 135 was outputted, then the record 135 from the lower level 130 is discarded in step 323 and the record 135 from the scanlet's level 130 is added to the resulting set of records 135 since that record 135 survived filter operation 310 and supersedes the record 135 from the lower level 130. Merge operation 320 then proceeds to another record 135 of the records 135 passed from the lower level 130. But if a superseding record 135 was not outputted by filter operation 310, then merge operation 320 proceeds to step 324 and not step 323.

In step 324, scanlet 160 accesses a set of Bloom filters 220 from its level 130 and then determines whether they indicate that a record 135 corresponding to the same key (as the record 135 being assessed) is present in a file 210 of its level 130. Accordingly, scanlet 160 may hash the key and determine if the bits of the accessed Bloom filter 220 have been set for the resulting hash value. If the bits have not been set, then there is no superseding record 135 in the scanlet's level 130, so scanlet 160 includes the record 135 from the lower level 130 in the resulting set, in step 325. If the relevant bits have been set, then the Bloom filter 220 indicates that a record 135 may be stored in the scanlet's level 130. Scanlet 160 proceeds to step 326 instead of step 325 from step 324. In some embodiments, scanlet 160 may use Bloom filters 220 to determine if a potential superseding record 135 even exists before filter operation 310 is completed—thus scanlet 160 may perform step 324 before step 322.

In step 326, scanlet 160 determines if a record 135 that corresponds to the same key (as the record 135 being assessed) is present in a file 210. Consequently, scanlet 160 may retrieve a file 210 from its level 130 and check it for any superseding record 135. In some cases, filter operation 310 may output information that identifies records 135 that were filtered out and thus did not satisfy the stipulations of the key range search. In either case, if scanlet 160 determines that a superseding record 135 from its level 130 was filtered out, then it discards the superseded record 135 received from the lower level 130. A superseding record 135 can be filtered out for various reasons. For example, if the underlying construct (e.g., a row in a table) is deleted, then a tombstone record may be written to the database that indicates the deletion of the underlying construct. A tombstone record supersedes the other record versions and may always be filtered out. As another example, an update to a value of a record may cause it to be filtered if the new value does not satisfy the set of selection criteria. If scanlet 160 determines that no superseding record 135 is present in its level 130, then scanlet 160 includes the record 135 from the lower level 130 in the resulting set, in step 325 and does not perform step 327.

Figure 4:
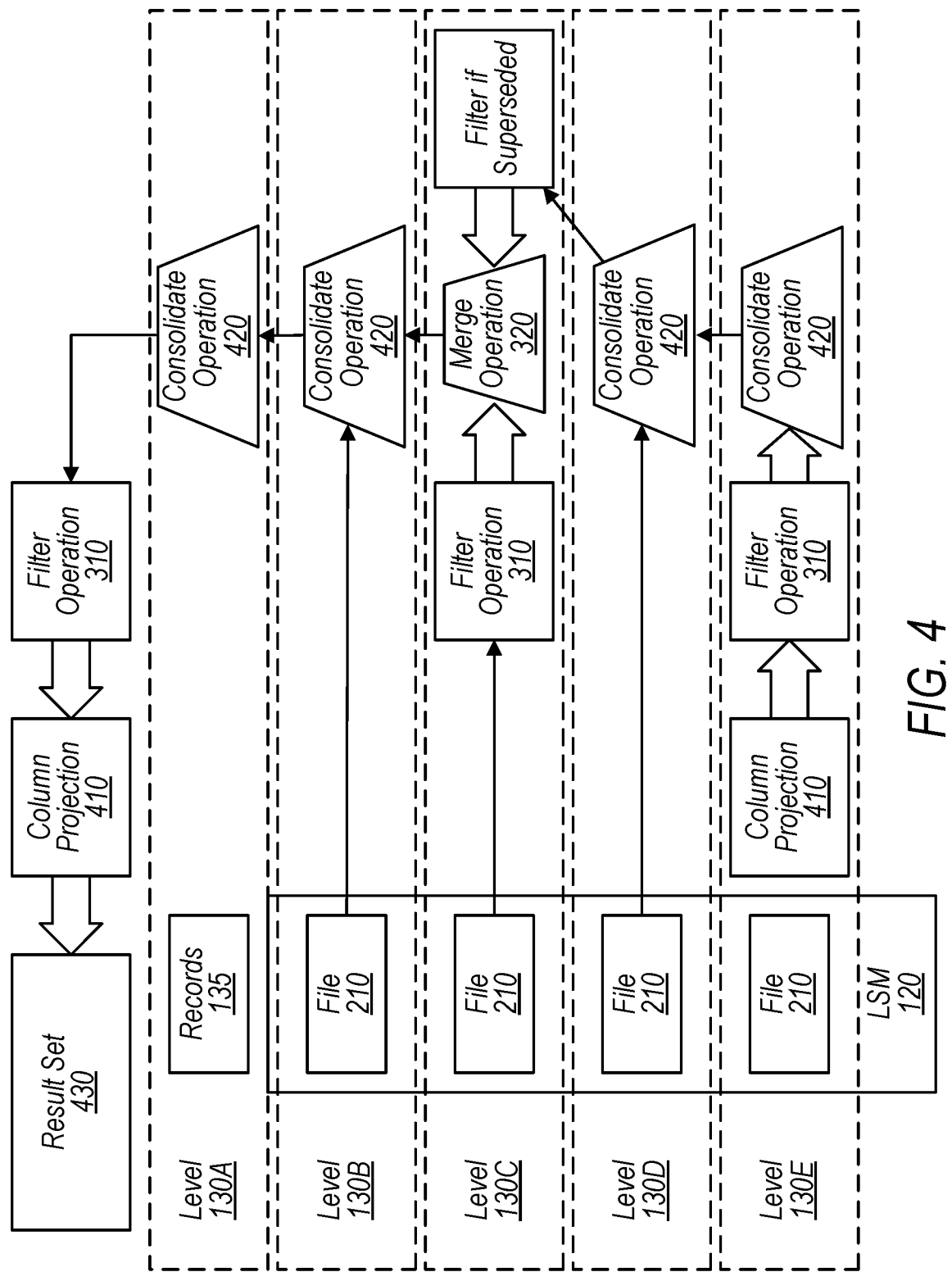
FIG. 4 is a block diagram illustrating example elements of layered filtering applied at different levels of a database, according to some embodiments.

Turning now to FIG. 4, a block diagram of an example of layered filtering that is applied at different levels of a database is shown. In the illustrated embodiment, there are levels 130A-E that store records 135 or files 210 that includes records 135. As further shown, levels 130A, 130B, 130D, and 130E each involve a consolidate operation 420, while level 130C involve a filter operation 310 and a merge operation 320. Also as shown, level 130E involves a column projection 410. The illustrated embodiment may be implemented differently than shown. For example, all levels 130 may involve filter operation 310 and merge operation 320.

In various embodiments, filter operation 310 and merge operation 320 are implemented at selective levels 130 of the hierarchy of levels. If only a small percentage of records 135 in a level 130 survive filter operation 310, it may save a considerable amount of work to implement filter operation 310 at that level 130. If there is a large number of records in a level 130, it may be more work to check records 135 that are received from lower levels 130 to ensure that they are not superseded by the level 130. Accordingly, there are tradeoffs regarding when to perform filter operation 310 and merge operation 320. Since the bottom level 130 (i.e., level 130E) does not have to check for superseding records 135, it may be beneficial to perform filter operation 310 at the bottom level 130.

As shown, processing level 130E involves column projection 410, filter operation 310, and consolidate operation 420. Column projection 410, in various embodiments, is an operation that involves selecting a set of columns from records 135 to return. For example, a key range search may request two particular columns from a hundred-column table and thus column projection 410 may return records 135 having those two particular columns, with the other columns being dropped. The scanlet 160 of level 130E may select records 135 that fall within a key range of the key range search and then perform column projection 410 on the selected records 135. The scanlet 160 may then perform filter operation 310 to remove, from those selected records 135, records 135 that do not satisfy the criteria of the key range search. In some embodiments, filter operation 310 is performed before column projection 410. After performing the operations, the scanlet 160 performs consolidate operation 420 and provides the resulting set of records 135 to level 130D.

Consolidate operation 420, in various embodiments, is an operation performed by a scanlet 160 to combine the records 135 selected for its level 130 with the records 135 received from lower levels 130. For example, the scanlet 160 of level 130D may select records 135 that fall within a key range of the key range search. Thereafter, the scanlet 160 may perform consolidate operation 420 to produce a resulting set by adding the lower-level records 135 (if applicable) to the selected records 135 if the lower-level records 135 are not superseded by the selected records 135. That is, if the selected records 135 and the lower-level records 135 both include a respective record 135 for the same key, then the record 135 from the selected records 135 is added to the resulting set. The scanlet 160 does not assess, as a part of consolidate operation 420, whether a record 135 was filtered out at its level 130 since there was no filter operation 310 performed. The scanlet 160 provides the resulting records 135 to level 130C.

Level 130C involves filter operation 310 and merge operation 320 but does not involve column projection 410. The scanlet 160 of level 130C generates a resulting set of records 135 based on the records 135 from its level 130C and those passed up from level 130D. The scanlets 160 of levels 130A and 130B perform respective consolidate operations 420, as shown. Since filter operation 310 and column projection 410 may not be implemented at every level 130, in various embodiments, filter operation 310 and column projection 410 are performed on a total set of records 135 returned from the scanned levels 130 of the hierarchy of levels to produce a result set 430 that satisfies the key range search. Database node 140 may then return result set 430 as a response to the requestor of that key range search.

In some embodiments, an additional case may be considered for a level 130 other than the consolidate case or the merge case that are discussed above. In particular, a restricted filter case may be applied to a level 130 in which a filter is used that applies the selection criteria to only "initial" records 135 and simply outputs all non-initial records 135. An initial record 135 is defined, in this context, as the oldest version of the underlying data structure (e.g., a row) for a key in LSM tree 120 (i.e., an initial record 135 is guaranteed to not supersede any record 135 from lower levels 130 than its current level 130). In various embodiments, an initial record 135 can be identified (e.g., marked as an initial record 135) when it is first inserted into LSM tree 120. Because the restricted filter case only removes initial records 135, when combining with the record set from lower levels 130, a scanlet 160 does not have to perform the extra step of checking for filtered superseding records 135. That is, since the restricted filter case removes (from records 135 that fall within a certain key range) only those records 135 that do not satisfy the selection criteria and are guaranteed to not supersede records 135 from lower levels 130, a scanlet 160 does not have to check whether those removed (initial) records 135 supersede any records 135 passed up from lower levels 135 as a part of a key range scan. The restricted filter case may be considered to reside between the consolidate case and the merge case in terms of tradeoffs as the restricted filter case can reduce the number of records 135 added to a resulting set and therefore reduce the number of records 135 that are passed up to the next scan operation, without incurring the cost of checking for filtered superseding records 135 as done in the merge case.

Figure 5:
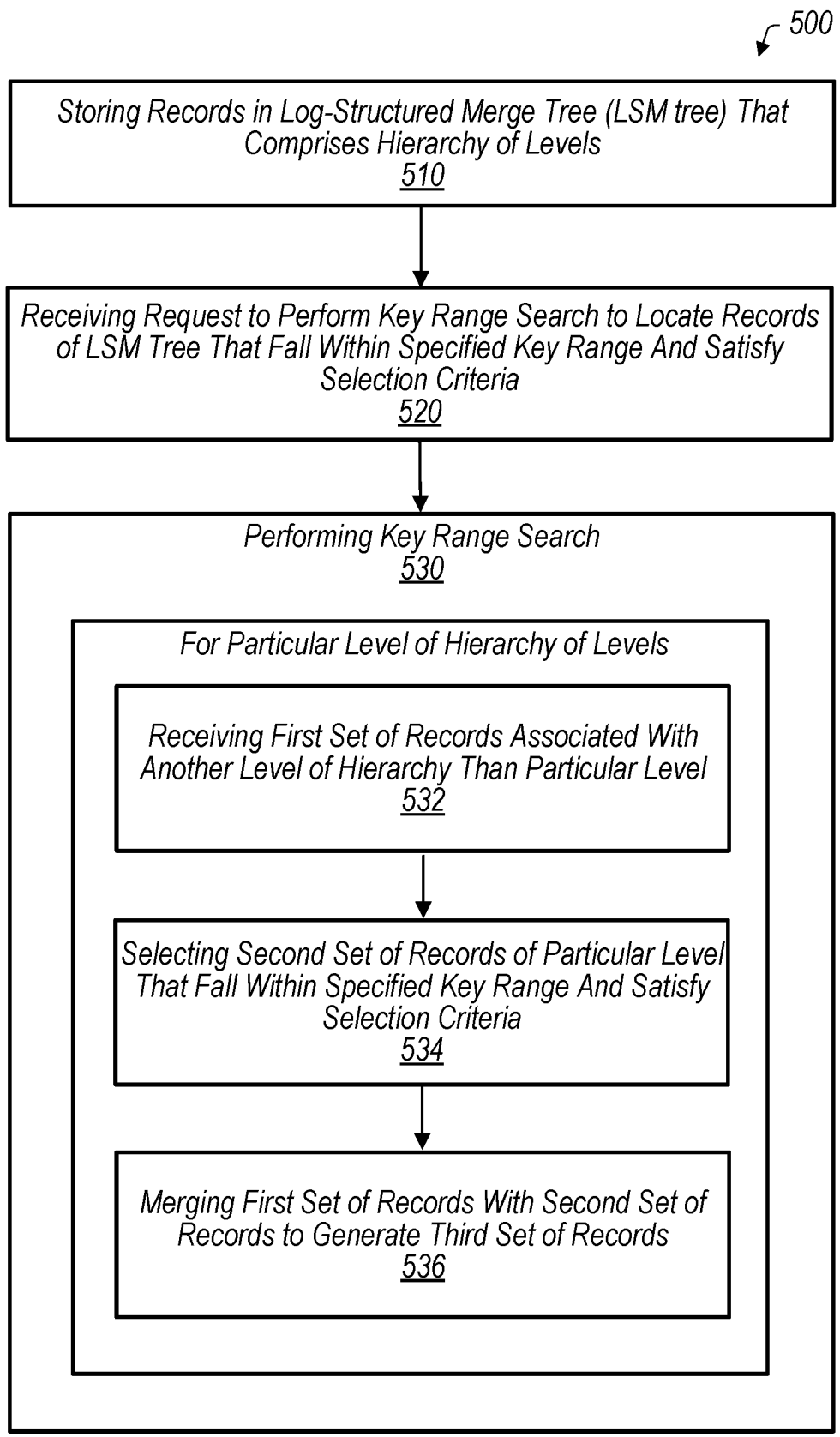
FIG. 5 is a flow diagram illustrating example method relating to a key range search that involves layered filtering, according to some embodiments.

Turning now to FIG. 5, a flow diagram of a method 500 is shown. Method 500 is one embodiment of a method that is performed by a computer system (e.g., database node 140) to implement a key range search that involves layered filtering. In various embodiments, method 500 is performed by executing a set of program instructions that is stored on a non-transitory computer-readable medium. Method 500 may include more or less steps than are shown. For example, method 500 may include a step in which the computer system merges a record down through levels of a hierarchy of levels over time.

Method 500 begins in step 510 with the computer system storing records (e.g., records 135) in a log-structured merge tree (LSM tree) (e.g., LSM tree 120) that comprises a hierarchy of levels (e.g., levels 130). In various embodiments, the storing includes inserting a record at a top level of the hierarchy of levels of the LSM tree. In step 520, the computer system receives a request (e.g., a read request 105) to perform a key range search to locate records of the LSM tree that fall within a specified key range and satisfy selection criteria. The request to perform the key range search may also specify a column projection to be applied to the records.

In step 530, the computer system performs the key range search, including for a particular level of the hierarchy of levels. As part of performing the key range search for the particular level, in step 532, the computer system receives a first set of records associated with another level of the hierarchy than the particular level. The first set of records may include records whose database keys fall within the key range specified by the request but were not filtered based on the selection criteria. In various embodiments, the particular level is a higher level in the hierarchy of levels than the other level and includes newer records than the other level.

In step 534, the computer system selects a second set of records of the particular level that fall within the specified key range and satisfy the selection criteria. The particular level may be associated with a set of probabilistic structures (e.g., Bloom filters 220) that indicates whether a record is not included in the particular level for a key. Performing the merge operation may include identifying, based on the set of probabilistic structures, a particular record of the first set of records to potentially not include in a third set of records and searching the particular level for a record that corresponds to a key of the particular record. The performing of the merge operation may further include, in response to locating a record for the key, not including that particular record in the third set of records. In various embodiments, the performing of the key range search for the particular level includes applying a column projection (e.g., column projection 410) to the second set of records.

In step 536, the computer system merges the first set of records with the second set of records to generate a third set of records. Merging those sets may include performing a merge operation (e.g., merge operation 320) to not insert, into the third set of records, any record of the first set of records for which there is a newer version in the particular level that does not satisfy the selection criteria. The first and second set of records may further include a respective record for a particular key, and the merging may include inserting, into the third set of records, the record of the second set that is associated with the particular key but not the record of the first set that is associated with the particular key.

In some embodiments, performing the key range search includes executing, for each of the hierarchy of levels, a set of scan processes (e.g., scanlets 160) operable to produce a set of records to be returned for that level. A set of scan processes for the particular level is operable to perform the selecting and the merging and to provide the third set of records to a set of scan processes of a higher level of the hierarchy than the particular level. In some embodiments, the computer system obtains a total set of records that includes records returned from the hierarchy of levels. The computer system may generate a result set of records (e.g., a result set 430) from the total set of records by removing, from the total set of records, any record that does not satisfy the selection criteria. The computer system may return the result set of records to an issuer of the request (e.g., via a read response 107). The total set of records may also include records returned from an in-memory cache (e.g., in-memory buffer 150) of the computer system and that fall within the specified key range and satisfy the selection criteria. The in-memory cache may be distinct from the LSM tree.

Exemplary Computer System

Figure 6:
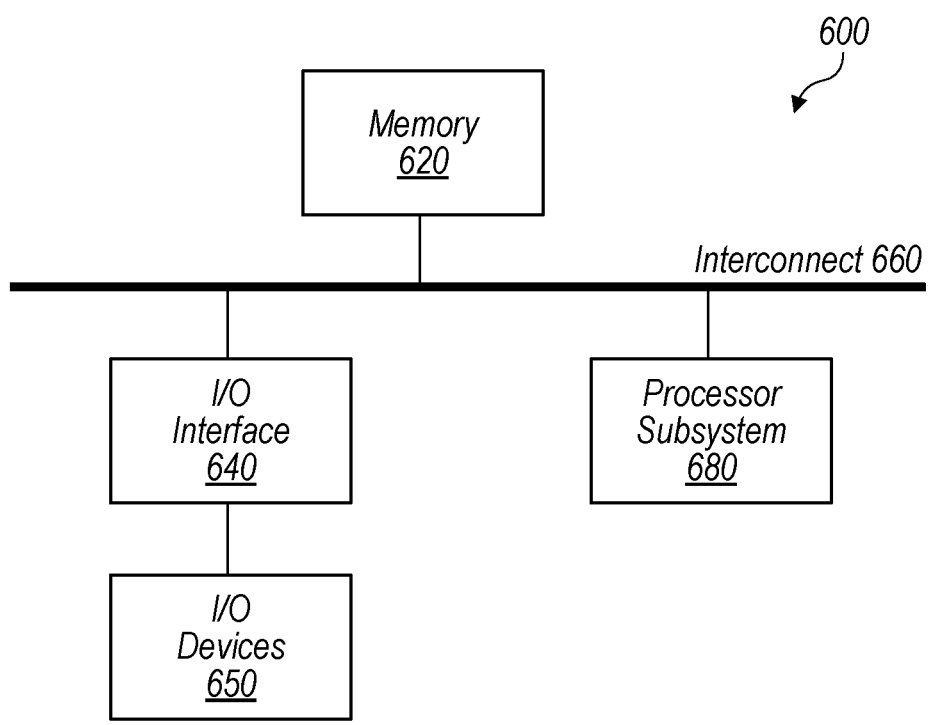
FIG. 6 is a block diagram illustrating elements of a computer system for implementing various systems described in the present disclosure, according to some embodiments.

Turning now to FIG. 6, a block diagram of an exemplary computer system 600, which may implement system 100, database store 110, or database node 140, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement in-memory buffer 150 and/or scanlets 160 may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

What is claimed is:

1. A method, comprising:
    storing, by a computer system, records in a log-structured merge tree (LSM tree) that comprises a hierarchy of levels;
    receiving, by the computer system, a request to perform a key range search to locate records of the LSM tree that fall within a specified key range and satisfy selection criteria; and
    performing, by the computer system, the key range search, including for a particular level of the hierarchy of levels:
        receiving a first set of records associated with a lower level of the hierarchy than the particular level, wherein the lower level stores a greater number of records than the particular level;
        selecting a second set of records of the particular level that fall within the specified key range and satisfy the selection criteria; and
        merging the first set of records with the second set of records to generate a third set of records, wherein the merging includes performing a merge operation to not insert, into the third set of records, any record of the first set of records for which there is a newer version in the particular level that does not satisfy the selection criteria.

2. The method of claim 1, wherein the first set of records includes records whose keys fall within the specified key range but were not filtered based on the selection criteria.

3. The method of claim 1, further comprising:
    obtaining, by the computer system, a total set of records that includes records returned from the hierarchy of levels;
    generating, by the computer system, a result set of records from the total set of records by removing, from the total set of records, any record that does not satisfy the selection criteria; and
    returning, by the computer system, the result set of records to an issuer of the request.

4. The method of claim 3, wherein the total set of records further includes records returned from an in-memory cache of the computer system and that fall within the specified key range and satisfy the selection criteria, wherein the in-memory cache is distinct from the LSM tree.

5. The method of claim 1, wherein the request to perform the key range search specifies a column projection to be applied, and wherein the performing of the key range search for the particular level includes applying the column projection to the second set of records.

6. The method of claim 1, wherein the particular level is associated with a set of probabilistic structures that indicates whether a record is not included in the particular level for a key, and wherein the performing of the merge operation includes:
    identifying, based on the set of probabilistic structures, a particular record of the first set of records to potentially not include in the third set of records; and
    searching the particular level for a record that corresponds to a key of the particular record.

7. The method of claim 6, wherein the performing of the merge operation includes, in response to locating a record for the key, not including the particular record in the third set of records.

8. The method of claim 1, wherein the storing includes inserting a record at a top level of the hierarchy of levels of the LSM tree, and the method further comprising:
    merging, by the computer system, the record through levels of the hierarchy of levels over time, wherein the particular level includes newer records than the lower level.

9. The method of claim 1, wherein the performing of the key range search includes executing, for each of the hierarchy of levels, a set of scan processes operable to produce a set of records to be returned for that level, wherein a set of scan processes for the particular level is operable to perform the selecting and the merging and to provide the third set of records to a set of scan processes of a higher level of the hierarchy than the particular level.

10. The method of claim 1, wherein the first and second sets of records include a respective record for a particular key, and wherein the merging includes inserting, into the third set of records, the record of the second set that is associated with the particular key and not the record of the first set that is associated with the particular key.

11. A non-transitory computer readable medium having program instructions stored thereon that are executable by a computer system to cause the computer system to perform operations comprising:
   storing records in a hierarchy of levels of a database;
   receiving a request to perform a key range search to locate records of the database that fall within a specified key range and satisfy selection criteria; and
   performing the key range search, including for a particular level of the hierarchy of levels:
      receiving a first set of records associated with a lower level of the hierarchy than the particular level, wherein the lower level stores a greater number of records than the particular level;
      selecting a second set of records of the particular level that fall within the specified key range and satisfy the selection criteria; and
      merging the first set of records with the second set of records to generate a third set of records, wherein the merging includes performing a merge operation to not insert, into the third set of records, any record of the first set of records for which there is a newer version in the particular level that does not satisfy the selection criteria.

12. The non-transitory computer readable medium of claim 11, wherein the performing of the key range search includes:
   receiving a total set of records associated with a top level of the hierarchy of levels, wherein the total set of records incorporates records from lower levels of the hierarchy of levels;
   generating, by the computer system, a result set of records by removing, from the total set of records, any record that does not satisfy the selection criteria; and
   returning, by the computer system, the result set of records to a requestor of the request to perform the key range search.

13. The non-transitory computer readable medium of claim 11, wherein performing the key range search for the lower level associated with the first set of records includes:
   selecting records of the lower level that fall within the specified key range; and
   generating the first set of records by applying a restricted filter operation to the selected records that removes, from the selected records, only those records that are identified as initial records and do not satisfy the selection criteria.

14. The non-transitory computer readable medium of claim 11, wherein the performing of the merge operation includes:
   identifying, based on a set of Bloom filters, a particular record of the first set of records whose key potentially corresponds to a record in the particular level;
   searching the particular level for a record that corresponds to the key of the particular record; and
   in response to locating a record for the key in the particular level, not including the particular record in the third set of records.

15. The non-transitory computer readable medium of claim 11, wherein the merging includes inserting, into the third set of records, a first particular record of the second set of records that supersedes a second particular record of the first set of records, wherein the second particular record is not included in the third set of records.

16. A system, comprising:
   at least one processor; and
   a memory having program instructions stored thereon that are executable by the at least one processor to perform operations comprising:
      storing records in a log-structured merge tree (LSM tree) that comprises a hierarchy of levels;
      receiving a request to perform a key range search to locate records of the LSM tree that fall within a specified key range and satisfy selection criteria; and
      performing the key range search, including for a particular level of the hierarchy of levels:
         receiving a first set of records associated with a lower level of the hierarchy than the particular level, wherein the lower level stores a greater number of records than the particular level;
         selecting a second set of records of the particular level that fall within the specified key range and satisfy the selection criteria; and
         merging the first set of records with the second set of records to generate a third set of records, wherein the merging includes performing a merge operation to not insert, into the third set of records, any record of the first set of records for which there is a newer version in the particular level that does not satisfy the selection criteria.

17. The system of claim 16, wherein the merge operation is not performed for at least one level of the hierarchy of levels.

18. The system of claim 16, wherein the performing of the key range search includes
   performing a merge operation on a total set of records to remove, from the total set of records, any record that does not satisfy the selection criteria;
   applying a column projection to the total set of records to remove a particular set of columns from records of the total set of records; and
   returning the total set of records in a response to the request to perform the key range search.

19. The system of claim 16, wherein the performing of the key range search includes applying, for at least one level of the hierarchy of levels, a column projection to records of the at least one level that fall within the specified key range and satisfy the selection criteria.

20. The system of claim 16, wherein the performing of the merge operation includes using a Bloom filter to identify records of the first set of records for which there is potentially a newer version in the particular level.

* * * * *